(12) United States Patent
Chenillo et al.

(10) Patent No.: US 11,048,946 B2
(45) Date of Patent: Jun. 29, 2021

(54) SYSTEM AND METHOD FOR IDENTIFYING COGNATE IMAGE SEQUENCES

(71) Applicants: Samuel Chenillo, New York, NY (US);
Oran Gilad, Herzliya Pituach (IL);
Oren Steinfeld, Kfar Saba (IL)

(72) Inventors: Samuel Chenillo, New York, NY (US);
Oran Gilad, Herzliya Pituach (IL);
Oren Steinfeld, Kfar Saba (IL)

(*) Notice: Subject to any disclaimer, the term of this patent is extended or adjusted under 35 U.S.C. 154(b) by 0 days.

(21) Appl. No.: 17/072,491

(22) Filed: Oct. 16, 2020

(65) Prior Publication Data

US 2021/0034879 A1 Feb. 4, 2021

Related U.S. Application Data

(63) Continuation-in-part of application No. 16/389,957, filed on Apr. 21, 2019, now Pat. No. 10,867,185, which is a continuation-in-part of application No. 16/110,265, filed on Aug. 23, 2018, now Pat. No. 10,271,095, which is a continuation-in-part of application No. 15/852,389, filed on Dec. 22, 2017, now Pat. No. 10,096,169.

(Continued)

(51) Int. Cl.
*G06K 9/00* (2006.01)
*G06F 16/435* (2019.01)
*G06F 16/41* (2019.01)

(52) U.S. Cl.
CPC ......... *G06K 9/00758* (2013.01); *G06F 16/41* (2019.01); *G06F 16/435* (2019.01); *G06K 9/00718* (2013.01); *G06K 9/00744* (2013.01)

(58) Field of Classification Search
CPC .................................. G06K 9/00758
USPC .......................................................... 382/100
See application file for complete search history.

(56) References Cited

U.S. PATENT DOCUMENTS 7,881,657 B2 2/2011 Wang et al.
8,190,435 B2 5/2012 Wang et al.
(Continued)

OTHER PUBLICATIONS

Hasler, David et al., Measuring Colourfulness in Natural Images. Proceedings of SPIE—The International Society for Optical Engineering. 5007. 87-95. (2003).

*Primary Examiner* — Eileen M Adams
*Assistant Examiner* — Daniel T Tekle
(74) *Attorney, Agent, or Firm* — RosserIP, LLC; Roy Rosser

(57) ABSTRACT

A system and method of identifying cognate image sequences is disclosed that examines significant frames of a stream of video images using an array of image indexes. The image index array includes image indexes obtained by at least two different image indexing methods. These are compared to a corresponding array of image indices of significant frames of known image sequences. An image quality indicator is used to determine which set of image index thresholds to use in making the comparison. These thresholds are more stringent for higher quality frames. Two image sequences are considered cognate when a string of sufficiently many sequential frame matches is established. In an alternate embodiment, image blurriness is also, or instead, used to determine the appropriate set of image index thresholds. The sets of image index thresholds are determined using machine learning on a curated set of representative images.

8 Claims, 3 Drawing Sheets

Related U.S. Application Data

(60) Provisional application No. 63/092,217, filed on Oct. 15, 2020, provisional application No. 62/608,666, filed on Dec. 21, 2017.

(56) References Cited

U.S. PATENT DOCUMENTS

| | | | |
|---|---|---|---|
| 10,271,095 B1 | 4/2019 | Chenillo et al. | |
| 2013/0077873 A1* | 3/2013 | Bar Hillel | G06K 9/68 382/218 |
| 2014/0247264 A1* | 9/2014 | Sundberg | G06T 11/006 345/424 |
| 2018/0144466 A1* | 5/2018 | Hsieh | G06T 7/0012 |

* cited by examiner

SYSTEM AND METHOD FOR IDENTIFYING COGNATE IMAGE SEQUENCES

CROSS-REFERENCE TO RELATED APPLICATIONS

This application claims priority to U.S. Provisional Patent Application 63/092,217 filed on Oct. 15, 2020 entitled "System And Method for Identifying Cognate Image Sequences", and, is a continuation-in-part of U.S. patent application Ser. No. 16/389,957 entitled "System and Method for Media Segment Identification" filed on Apr. 21, 2019, that is a continuation-in-part US Patent Application of now issued U.S. Pat. No. 10,271,095 entitled "System and Method for Media Segment Identification" that issued on Apr. 23, 2019, having been filed as U.S. patent application Ser. No. 16/110,265 on Aug. 23, 2018, that in turn claims priority to U.S. patent application Ser. No. 15/852,389 filed on Dec. 22, 2017 entitled "System for the Augmented Assessment of Virtual Insertion Opportunities", now U.S. Pat. No. 10,096,169 issued on Oct. 9, 2018, and to U.S. Provisional Patent Application 62/608,666 filed on Dec. 21, 2017 entitled "Augmented Virtual Video-Insertion", the contents of all of which are hereby fully incorporated herein by reference.

BACKGROUND OF THE INVENTION

(1) Field of the Invention

The invention relates to a system and method for automatically identifying cognate image sequences, and more particularly to using an array of image indexes, augmented by one or more image quality indicators such as, but not limited to, the average intensity, the standard deviation, the colorfulness, the number of significant edges, or the blurriness of the images, to automatically compare image sequences of media segments to a database of known image sequences of media segments, and automatically identify cognate image sequences, i.e., image sequences that despite having been altered in different ways by, for instance, having been subjected to different compression algorithms, can be ascribed to a common, original image sequence.

(2) Description of Related Art

The technical problem of automatically identifying media segments by the image sequences they contain is inherent in the technical fields of media distribution and monitoring, and may be used for purposes such as, but not limited to, scheduling, billing, content substitution and intellectual property rights protection.

Attempting to match images using pixel by pixel comparison can be computationally expensive and especially challenging if a decision needs to be made in real, or near real, time, and if the images being compared are part of a real-time broadcast, or real-time streaming, of high definition video images.

One approach to making image comparison more efficient is to use image indexing. Image indexing may, for instance, use a pixel comparison algorithm to reduce each image to a more manageable amount of data called an image index. Image indices may be relatively short data strings—typically binary strings—that are nevertheless representative of the image, and may produce quasi "finger prints" of each image. Image indexing methods may, for instance, be designed that reduce a high definition, full color image containing as many as 921,600 pixels each capable of representing one of 16 million colors, to a simple binary string that may be on the order of 10 to 100 bits long. The resultant image index may still, however, be a reasonably good means of identifying the image it was made from. Such image indices may be relatively impervious to small changes in the original image. However, any significant change to the image may result in a significantly different image index. If video transmission were perfect, such image indices would be a very reliable way of tracking the images. However, in addition to unavoidable electronic channel noise, digital image distribution typically involves the use of compression and decompression algorithms. Although these compression and decompression algorithms are designed so that any changes they introduce are barely perceptible to the human eye, their use can have significant effects on other aspects of the images, such as, but not limited to, their statistical properties. This may mean that the image index of the image reconstructed after a compression/decompression cycle is significantly different from the image index of the original. As a consequence, using any single image indexing method to compare images before and after transmission that involves compression may result in significant errors under certain conditions. The error rate for each type of the image index methods may, for instance, depend on the overall nature, or quality of the image, i.e., on factors, such as, but not limited to, the overall amount of hue, color, color saturation, or image blurring in the image, as well as on the types of compression used in the transmission.

The problem is made more challenging when a system operates downstream from the original sources, without access to the original image sequences. This may, for instance, be the situation when the system operates at a point of delivery. In such a situation, rather than attempting to identify matching image sequences, the goal may be to identify cognate image sequences, i.e., image sequences that despite having been altered in different ways by, for instance, having been subjected to different compression algorithms, may be attributed to a common source image sequence.

What is needed is a system that can operate downstream from the point of origin and can tolerate a wide range of artifacts that may be introduced in into the content during the transmission of the content from, for instance, the point of origin to the point of delivery. In addition to changes in brightness, saturation and blur, the system should be capable of identifying images as being related, or cognate, despite transmission introduced artifacts such as but not limited to, compression degradation, alterations in the video formatting or frame rate, spatial editing alterations such as scaling or rotation, temporal changes such as localized insertions, swaps or deletions, or some combination thereof.

It is also desirable that the system can identify related, or cognate, image sequences in real-time in a linear fashion, i.e., make the identification as the incoming sequence is streamed past, without the need for any significant local storage of the incoming content. Furthermore, it is desirable that the system algorithms are able to be run using modest computational resources and power. Ideally such a system may operate on a cellphone or a digital device having comparable computational resources.

The relevant prior art includes:

U.S. Pat. No. 7,881,657 issued to Wang, et al. on Feb. 1, 2011 entitled "Method for high-throughput identification of distributed broadcast content" that describes a method and system of performing high-throughput identifications of broadcast content. A device is disclosed that can send a content identification query, which includes a sample of content being broadcast, to a server to request an identity of the content. The server will perform a computational identification of the content, return the result to the device, and store the result. For all subsequently received content identification queries requesting an identity of content being broadcast from the same source and in a time during which the content is still being broadcast from the source, the server will send the stored content identification in response to the subsequent queries. If a subsequent content identification query does not request the identity of content being broadcast from the same source or is not received during the time that the content is still being broadcast, the server will perform a computational identification of a content sample.

U.S. Pat. No. 8,190,435 issued to Li-Chun Wang, et al. on May 29, 2012 entitled "System and methods for recognizing sound and music signals in high noise and distortion" that describes a method for recognizing an audio sample that locates an audio file that most closely matches the audio sample from a database indexing a large set of original recordings. Each indexed audio file is represented in the database index by a set of landmark-time points and associated fingerprints. Landmarks occur at reproducible locations within the file, while fingerprints represent features of the signal at or near the landmark-time points. To perform recognition, landmarks and fingerprints are computed for the unknown sample and used to retrieve matching fingerprints from the database. For each file containing matching fingerprints, the landmarks are compared with landmarks of the sample at which the same fingerprints were computed. If a large number of corresponding landmarks are linearly related, i.e., if equivalent fingerprints of the sample and retrieved file have the same time evolution, then the file is identified with the sample. The method can be used for any type of sound or music, and is particularly effective for audio signals subject to linear and nonlinear distortion such as background noise, compression artifacts, or transmission dropouts. The sample can be identified in a time proportional to the logarithm of the number of entries in the database; given sufficient computational power, recognition can be performed in nearly real time as the sound is being sampled.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method of identifying an image sequence of a media segment as being cognate with a previously obtained image sequence is disclosed. In the method of the present invention, a media segment in the form of an incoming stream of video images may be examined to ascertain if it contains one or more sequences that are cognate to a known, or previously acquired, image sequence in a known media segment. This examination may be performed in real, or near real, time, in a linear, or quasi linear fashion. The known, or previously acquired, media segments may, for instance, be, but are not limited to, commercial advertisements.

The known video image sequences may be stored in a digital storage device that may constitute a database of known video image sequences. These known image sequences may be part of a media segment, and be stored with associated information such as, but not limited to, audio files, origin identifiers and time stamps.

An attempt to identify an image sequence as cognate with another image sequence may, for instance, begin by the system obtaining a first significant frame of the incoming stream of video images, and comparing that to the first significant frames of the known image sequences.

Both the known image sequences and the image sequence being identified may be acquired downstream from their point of origin and may have been subject to a variety of different transmission induced artifacts.

In a preferred embodiment, the comparison may be accomplished by first obtaining an array of images image indices and an image quality indicator of a significant frame of the incoming stream. This array of image indices may then be compared to an array of image indices of the corresponding significant frame from one of the known image sequences. The image quality indicator of the significant frame may, for instance, be used to select an appropriate set of predetermined image index thresholds to be used to test the match. The image quality indicator may, for instance, be one of an image's average intensity, standard deviation, colorfulness, a number of significant edges, or a blurriness. The image index thresholds may, for instance, be substantially inversely proportional to a value of the image quality indictor, i.e., they may be more stringent for frames having higher quality images. For each type of image index, each of which may be a short binary string representation of the image, the image index of the incoming significant frame, and known significant frame may be compared. A frame match may be determined if the difference between the image indices is less than, or equal to, the relevant threshold. A frame match may only be found if this holds for all of the image index methods being used.

For the known image clips, or sequences, in which the first significant frame matches the first significant frame of the incoming stream, further significant frames may then be compared. If the number of further frame matches of particular known image sequence exceeds a predetermined length of time, or number of frames, or some combination thereof, the incoming video sequence may be identified as being cognate with that known image sequence, i.e., both video sequences are derived from the same original video sequence.

Significant frames may, for instance, be readily identifiable frames such as, but not limited to, a first frame after a scene cut, a first frame after a significant change in audio level, a first frame after a black frame, a first frame after a significant change in colorfulness, a first frame after a significant change in blurriness, or a frame that occurs a predetermined time, or number of frames, after a previous significant frame.

The image indexing methods used in obtaining the array of image indices may include two or more of the methods described in detail below, such as, but not limited to, an average image index, a perceptual image index, a difference image index, a block mean image index or a median image index.

The array of predetermined image index thresholds may, for instance, be calculated, or obtained, using machine learning on a training set of curated images. For reliable image index thresholds, the training set may need to be well curated and sufficiently numerous, preferably containing at least 1000 unique images.

Therefore, the present invention succeeds in conferring the following, and others not mentioned, desirable and useful benefits and objectives.

It is an object of the present invention to provide a method of efficiently and reliably identifying an image sequence as being cognate with a previously obtained image sequence.

A further object of the present invention is to provide an image sequence identification that is robust across a range of compression and decompression techniques used in video distribution.

Another object of the present invention is to provide an image identification system that can operate downstream from the point of origin of the image sequences, and can tolerate a wide range of artifacts that may be introduced in into the content during the transmission of the content from, for instance, the point of origin to the point of delivery.

Yet another object of the present invention is to provide a system and method that can identify cognate image sequences in real-time in a linear fashion, i.e., make the identification as the incoming sequence is streamed past, without the need for any significant local storage of the incoming content.

It is a further object to provide a system and method that can identify cognate image sequences using modest computational resources and power.

DETAILED DESCRIPTION OF THE INVENTION

Figure 1:
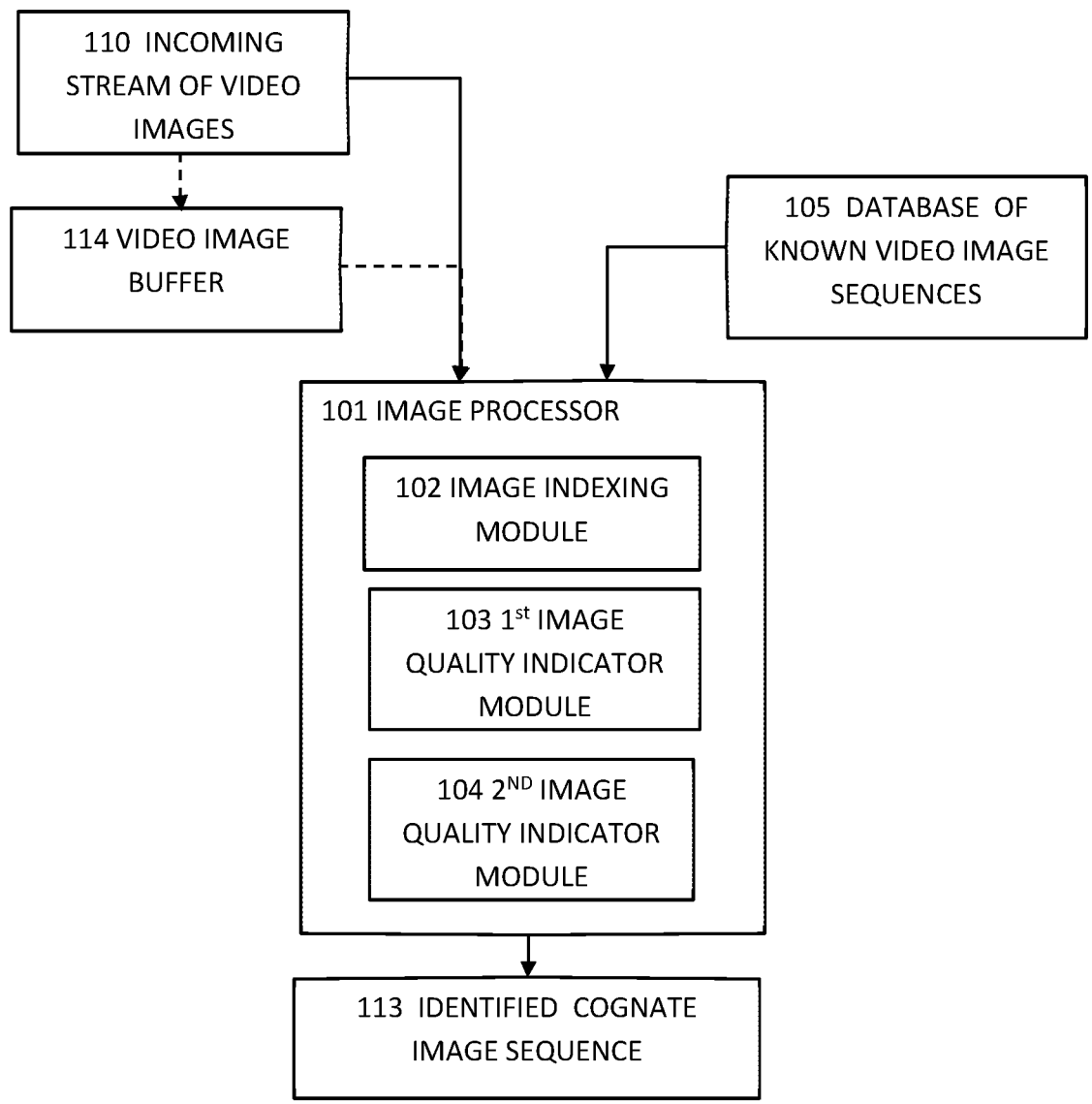
FIG. 1 shows a schematic arrangement of representative elements of a system for identifying a cognate image sequence of an exemplary embodiment of the present invention.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic arrangement of representative elements of a system for identifying a cognate image sequence of an exemplary embodiment of the present invention.

As shown in FIG. 1, an image processer 101 may be used to compare an incoming stream of video images 110 with a database 105 of known video image sequences in order to identify a cognate image sequence 113, i.e., an image sequence in the incoming stream of video images 110 that, to within acceptable limits of error, may be identified as being derived from the same original image sequence as one of the known image sequences in the database 105 of known video image sequences. An acceptable limit of error may, for instance, be that the two image sequences are considered to be the same by an average consumer of video images. The incoming stream of video images 110 may, for instance, be part of a media distribution such as, but not limited to, a television or media broadcast, or an Internet streaming event. The incoming stream of video images may be accompanied by additional information such as, but not limited to, an audio track, data identifying its point of origin, or a timing track, or some combination thereof.

The image processer 101 may, for instance, be a suitably programmed digital computational device, such as, but not limited to, a Samsung Galaxy Book S, manufactured by the Samsung Corporation of Seoul, South Korea, and which uses the Qualcomm Snapdragon 2.85 GHz, 64 bit "system on a chip" supplied by Qualcomm Technologies of San Diego, Calif.

The image processer 101 may contain, or have functional access to, one or more image processing modules such as, but not limited to, an image indexing module 102, a $1^{ST}$ image quality indicator module 103 and a $2^{nd}$ image quality indicator module 104. These modules may be programmed so as to function to automatically analyze the incoming stream of video images 110 and compare them to images contained in the database 105 of known video image sequences in order to automatically make a determination of whether or not the incoming stream contains one or more image sequences 113 that are cognate with a known image sequence.

The $1^{st}$ and $2^{nd}$ image quality indicator modules may each produce a quality value relying on a different aspect of the image such as, but not limited to, the image's average intensity, its standard deviation, its colorfulness, the number of significant edges it contains, or its blurriness. So for instance, the $1^{st}$ image quality indicator module may determine a value for the image's colorfulness, while the $2^{nd}$ image quality indicator module may determine a value for the image's blurriness.

The system may also include a video image buffer 114 that may, for instance, be a suitable digital storage device. The video image buffer 114 may, for instance, allow image data to be temporarily stored so as to allow the image processer 101 time to carry out the requisite data processing. The size of the video image buffer 114 may, therefore, be dependent on the data processing capability of the image processer 101. For a digital processor have the computational power of, for instance, the aforementioned Galaxy Book S, a suitable video image buffer 114 size, depending on the search strategy used, and methods of compression available, may range from as little as one second of uncompressed video to as much as five minutes, but more typically may be thirty seconds.

The problem of identifying cognate image sequences may be made more challenging when a system operates downstream from the original sources, without access to the original image sequences. This may, for instance, be the situation when the system operates at a point of delivery. In such a situation, rather than attempting to identify exactly matching image sequences, the goal may be to identify cognate image sequences, i.e., image sequences that despite having been altered in different ways by, for instance, having been subjected to different compression algorithms, can be ascribed to a common source image sequence.

In a preferred embodiment, the assumption may be that the system operates downstream from the point of origin of the images, typically at a point of delivery of the images. This condition may apply both when the images are being obtained to create the database 105 of known video image sequences and when obtaining the incoming stream of video images 110. Because of this assumption, the methods of the present invention for identifying cognate sequences of images may be designed to tolerate a wide range of artifacts that may be introduced into the content during the transmission of the content from, for instance, the point of origin to the point of delivery. In addition to changes in brightness, saturation and blur, the system may be designed to be capable of identifying images as being related, or cognate, despite transmission introduced artifacts such as but not limited to, compression degradation, alterations in the video formatting or frame rate, spatial editing alterations such as scaling or rotation, temporal changes such as localized insertions, swaps or deletions, or some combination thereof.

In a preferred embodiment, the methods may be implemented such that cognate image sequences may be identified in real-time in a linear fashion, i.e., the identification may be made as the incoming sequence is streamed past, without the need for any significant local storage of the incoming content. Furthermore, the system algorithms of the present invention may be run using modest computational resources and power.

Figure 2:
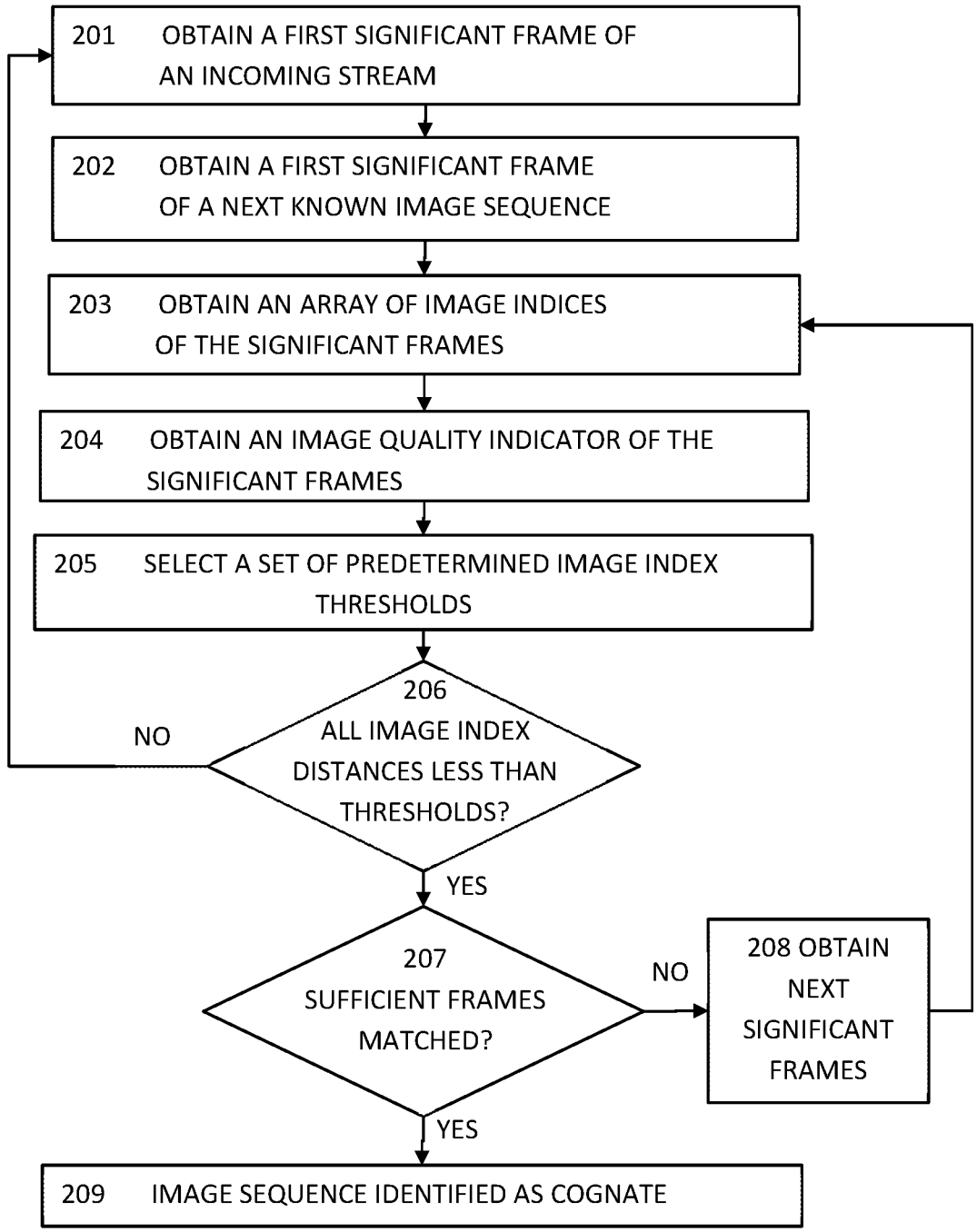
FIG. 2 shows a flow diagram of representative steps of a method of identifying cognate image sequences of an exemplary embodiment of the present invention.

FIG. 2 shows a flow diagram of representative steps of a method of identifying an image sequence as cognate with a known image sequence of an exemplary embodiment of the present invention.

In step 201: "OBTAIN A FIRST SIGNIFICANT FRAME OF AN INCOMING STREAM" the image processer may receive an incoming stream of digital media and automatically examine a stream of video images in that stream to identify a first significant frame.

A significant frame may, for instance, be a first frame after a scene cut, a first frame after a significant change in audio level, a first frame after a black frame, a first frame after a significant change in colorfulness, a first frame after a significant change in blurriness, or a frame that occurs after a given time, or number of frames, after a previous significant frame. Representative methods of detecting scene cuts, and other events suitable for characterizing a significant frame, are described in, for instance, U.S. Pat. No. 10,271, 095 entitled "System and Method for Media Segment Identification" that issued on Apr. 23, 2019, and is incorporated herein in its entirety.

In step 202: "OBTAIN A FIRST SIGNIFICANT FRAME OF A NEXT KNOWN IMAGE SEQUENCE", the image processer may automatically query the database of known video image sequences to obtain a first significant frame of a next one of the known image sequences stored therein. The system may, for instance, begin by obtaining the first significant frame of the first of the known image sequences. The order in which the system may cycle through the known sequences may, for instance, be dependent on some measure of their likelihood of appearing such as, but not limited to, the number of times they have been identified within a given previous amount of time such as, but not limited to, the previous 24 hours, the previous week, the previous month, or the previous year.

In step 203 "OBTAIN AN ARRAY OF IMAGE INDICES OF THE SIGNIFICANT FRAMES", the system may automatically obtain an array of image indices of the two significant image frames obtained in the previous two steps.

An array of image indices may consist of two or more image indices made using different image indexing methods on the same image. Using multiple image indexing methods in parallel may help avoid any weaknesses, i.e., the false negative and/or false positive rates, of any single image indexing method.

The following are representative examples of possible image imaging methods.

Average image indexing. This is an image indexing method that may be implemented by, for instance, using the following representative steps, or some suitable variation of them.

Step 1. Reduce the size of the image to a small fixed size, such as, but not limited to, an 8 by 8 pixel image. This may, for instance, be accomplished by a simple averaging of the individual red, green and blue (RGB) pixel values in a block of pixels. More complex methods of image reduction such as, but not limited to, using multiple passes in each of which a block of 4 pixels is averaged down to a to a single pixel, with passes being repeated until a desired final image size is reached, may also or instead be utilized. Many methods of reducing the size of images are known in the art, and any suitable one of them may be used instead.

Step 2. Reduce the color by converting the reduced image from an RGB color image to a grayscale image. This may, for instance, be accomplished by adding the RGB values of a pixel of the reduced image and dividing the resultant sum by 3. In the case where the image was reduced to an 8 by 8 image have 64 pixels, there would now be a reduced image having 64 grayscale pixels.

Step 3: Calculate the average value of the grayscale image pixels, i.e., sum the individual grayscale values, and divide that sum by the number of pixels.

Step 4: Generate the index. The index may, for instance, be generated by substituting a "1" if the pixel value is greater than or equal to the average pixel value, or a "0" if it is less than that average pixel value. This process may generate a binary string equal in length to the number of pixels in the reduced image, i.e., in our example of a reduction to an 8 by 8 image having 64 pixels, the result may be 64 bit binary string that may be the image index obtained by the average image indexing method.

A difference image indexing method may use the same first two steps detailed above, and the index may then generated by, for instance, treating the reduced grayscale image as a looped string of pixels, and giving the image index a "1" if the reduced image grayscale pixel is greater than or equal to the preceding pixel, else a "0", resulting in a binary string equal in length to the number of grayscale pixels in the reduced image.

A median image indexing method may use similar steps as those detailed above, but using a mean value instead of an average value.

More complex image indexing methods may use other aspects of the image. For instance, qualities that affect the perception of the image such as, but not limited to, to luma or brightness of the image may be used in the indexing process. The luma may be represented by a suitably weighted sum of the pixel values of an image. One method of approximating the luma may be to perform a discrete cosine transform using, for instance, a set of digital masks. The resultant luma approximation of the reduced size grayscale image may then be use to generate a binary string by one or more of the methods mentioned above, i.e., by, for instance, a stepwise comparison with a previous value, an average value, a mean value, or some combination thereof.

Other image index methods used may, for instance, make use of the mean value of a block of the image.

One of ordinary skill in the art may appreciate that the image indexing methods described above may be varied or combined in a variety of ways and still yield useful and useable image indices. Other image indexing methods may also, or instead, be used such as, but not limited to, one or more of the landmark linked image cross comparisons described, for instance in U.S. Pat. No. 10,271,095 entitled "System and Method for Media Segment Identification" that issued on Apr. 23, 2019, and is incorporated herein in its entirety.

In step 204: "OBTAIN AN IMAGE QUALITY INDICATOR OF THE SIGNIFICANT FRAMES" the system may automatically obtain an image quality indicator of either, or both, the significant frames being compared.

The image quality indicator may be any suitable measure of the images quality such as, but not limited to, one or more of the average intensity of the image, the standard deviation of pixel values of the image, the colorfulness of the image, the number of significant edges detectable in the image, or the blurriness of the image, or some combination thereof.

The average intensity or the standard deviation may be obtained by any suitable, well known method.

The colorfulness may, for instance, be computed by one or more of the methods described in, for instance, the article published by Hasler, David & Suesstrunk, Sabine (2003) entitled "Measuring Colourfulness in Natural Images" in Proceedings of SPIE—The International Society for Optical Engineering. 5007. 87-95, the contents of which are hereby incorporated by reference herein in their entirety.

In a preferred embodiment, the colorfulness may be computed using the method in which it may be set to a value equal to the standard deviation of the red minus the green values of the image pixels of the frame added to 30 percent of the mean deviation of the average of the sum of the red and green values minus the blue value of the image pixels of the frame.

Image blurriness may, for instance, be calculated using a method such as, but not limited to, a method in which the blurriness is determined as a value equal to the variance of the Laplacian of the image pixels.

In step 205: "SELECT A SET OF PREDETERMINED IMAGE INDEX THRESHOLDS" a computational module operative on the image processor 101 may automatically select a set of image index thresholds to be used in comparing the array of image indices of the significant frames obtained in step 203.

A typical image index may, for instance, be a 64 bit binary string. The distance between image indices may be calculated as the number of places in the string at which the digits are different, i.e., where one image index string has a "1" and the other a "0", or vice versa. In a perfect match, the image index distance may be zero. The image index threshold may be the maximum image index distance at which the images may be considered to be a match by, for instance, an average consumer.

The image processor may, for instance, select a set of predetermined image index thresholds from an array of them that may be stored in an array of predetermined image index thresholds. The array of predetermined image index thresholds may be an integral part of the image index module, or which may be stored as a separated database, or some combination thereof. The predetermined image index thresholds may have been determined, or calculated, by a method such as, but not limited to, using machine learning on a training set of an appropriate number of curated images.

A set of curated images may be a set of images that may include pairs of images selected to be representative of the changes that may be effected by various modes of image transmission, including compression and decompression algorithms, as well as of image characteristics such as, but not limited to, color, hue, saturation, colorfulness and blurriness, and combinations thereof. In a preferred embodiment, an appropriate number of curated images may be at least 1000, while in a more preferred embodiment, it may be at least 10,000. The curation of the set of images may be performed by an average consumer of video images, or it may be performed by one or more individuals possessing a particular attribute that may be a strength or a weakness, such as, but not limited to, a video production expert, or a person having a particular type of visual impairment such as, but not limited to, color blindness, or some combination thereof.

The sets of image index thresholds may be different for different image qualities, such as, but not limited to, average color, mean color, average hue, mean hue, colorfulness, blurriness, or some combination thereof. For instance, in one preferred embodiment, the set of predetermined image index thresholds may be different for different amounts of colorfulness, and may be substantially inversely proportional to the colorfulness, i.e., they may be more stringent for more colorful frames. For instance, in an array image index having two distinct image index methods, such as, but not limited to, an average image index and a perceptual image index, there may be sets of two image index thresholds, each of which may apply at a different value of image colorfulness, or range of colorfulness. There may, for instance, be two colorfulness ranges such that if the colorfulness is equal to, or less than, a quality, or colorfulness, threshold, a first set of image index thresholds may be used, else a second set of thresholds may be used. For instance, in one preferred embodiment in which the colorfulness threshold may be set to 20, a set of image index thresholds, or an image distance vector (15, 15) may be used if the colorfulness is below that threshold, while a second set of image index thresholds, or image distance vector (20, 21), may be used otherwise.

In step 206: "ALL image index DISTANCES LESS THAN THRESHOLDS?" the system may compare the array of image indexes, obtained in step 203, of the two significant frames obtained in steps 201 and 202. This comparison may be made using the set of predetermined image index thresholds obtained in step 205. If all the image index distances are less than the selected image index thresholds, a match may be deemed to have been obtained. That is, if, for each image indexing method in the image index array, the calculated image indices for the incoming frame and the known sequence frame differ by a number of instances in the binary string that is less than, or equal to, the image index threshold for that image indexing method, then a match may be deemed to have occurred. If a match has occurred, the system may then progress to step 207, else if a match has not occurred, the system may proceed back to step 201, reverting back to the first significant frame of the incoming stream, and obtain a significant frame of a next, or another, known image sequence in the known image sequence database.

In step 207: "SUFFICIENT FRAMES MATCHED?", which may be reached after a significant frame match has occurred, the system may check to determine if a sufficiently long string of frame matches has occurred. This string of sequential matches may allow the system to determine that the image sequence being detected in the incoming stream of video images is one of the known image sequences contained in the database of known video image sequences. The length of the string of sequential matches may be a number of frames, or a length of time, or some combination thereof. In a preferred embodiment, the number of sequential frame matches to have occurred in order to declare that an equivalent image sequence has been identified may be 10, while in a more preferred embodiment, it may be 50 and in a most preferred embodiment it may be 100. In an alternate preferred embodiment, the temporal length of the string of sequential frame matches necessary in order to declare that an equivalent image sequence has been identified may be half a second, while in a more preferred embodiment, it may be 1 second and in a most preferred embodiment it may be 10 seconds.

If sufficient frames have not been matched, the system may proceed to step 208 "OBTAIN NEXT SIGNIFICANT FRAMES" and obtain the next significant frame of the known image sequence for which the current significant frame matched that of the incoming stream. The system may also obtain the next significant frame of the incoming stream. Having obtained the two next significant frames, the system may revert to step 203 to obtain array image indices of them.

On the other hand, if sufficient frames have been matched, the system may proceed to step 209, and identify the image sequence as being cognate with the known image sequence.

Once identified as being cognate, that information, or the sequence itself, or both, may be passed on to other computational modules for relevant use. For instance, the sequence may have been identified as a sequence that is an advertisement that may need to be blocked, or substituted out. Alternately, it may be identified as an advertisement that was paid for to be aired, and the fact that it has now aired at a particular time on a particular channel or streaming system, may now be recorded for accounting and/or royalty payment purposes.

Figure 3:
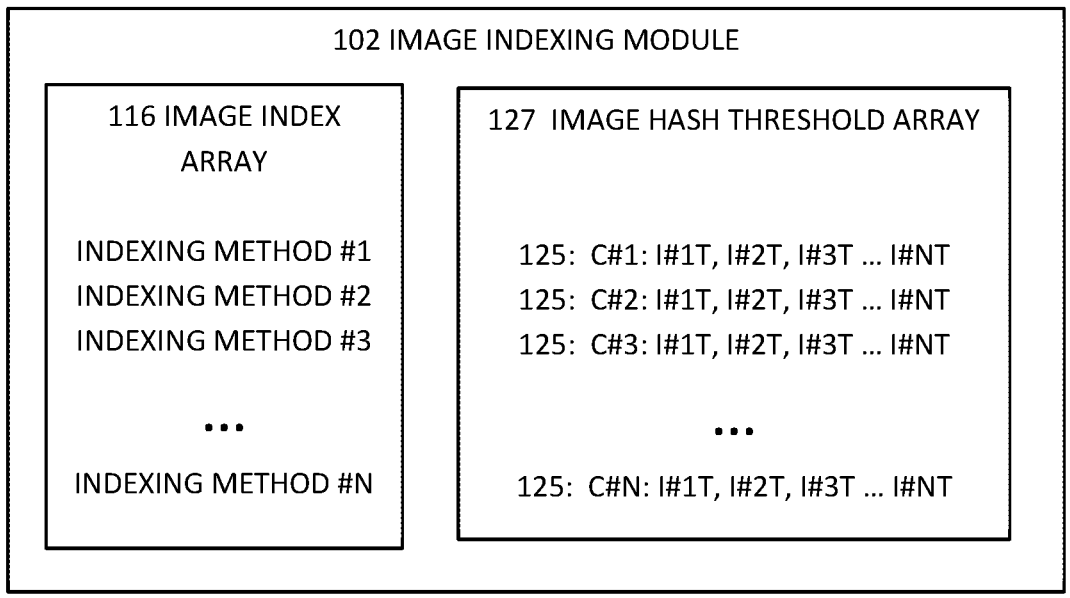
FIG. 3 shows a schematic arrangement of representative elements of an image indexing module as configured in an exemplary embodiment of the present invention.

FIG. 3 shows a schematic arrangement of representative elements of an image index module as configured in an exemplary embodiment of the present invention.

The image indexing module 102 may include an image index array 116 and an image index threshold array 127. The image index array 116 may, for instance, have an array of image indices that may be an array of programed modules for performing image indexing, i.e., methods of indexing images. The methods of image indexing available for use in the array may include methods such as, but not limited to, average image indexing, perceptual image indexing, difference image index, a block mean image index or a median image index as described above; or it may also, or instead, use image indices such as, but not limited to, one or more of the landmark linked image cross comparisons described in, for instance, U.S. Pat. No. 10,271,095 entitled "System and Method for Media Segment Identification" that issued on Apr. 23, 2019, and is incorporated herein in its entirety.

The image index threshold array 127 may include one or more sets of predetermined image index thresholds 125. The set of predetermined image index thresholds 125 may, for instance, be of the form:

C#1: I#1T, I#2T, I#3T . . . I#NT where C#1 may refer to a condition, or set of conditions, under which this set of thresholds may be used. C#1 may, for instance, refer to conditions such as, but not limited to, a range of colorfulness, a range of blurriness, a specific colorfulness, a specific blurriness, or some combination thereof.

I#1T, I#2T, I#3T . . . I#NT may represent the numerical values to be used for each of the image indices used in the image index array, i.e., I#1T may be the image index distance allowed when using image index METHOD #1, I#2T may be the image index distance allowed when using image index METHOD #2, and so on.

Figure 4:
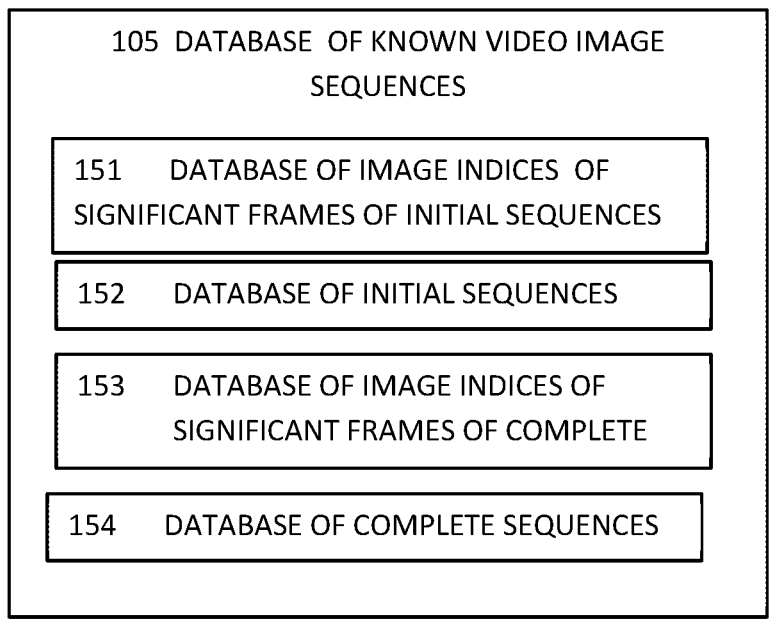
FIG. 4 shows a schematic arrangement of representative elements of a database of known video image sequences as configured in an exemplary embodiment of the present invention.

FIG. 4 shows a schematic arrangement of representative elements of a database of known video image sequences as configured in an exemplary embodiment of the present invention.

The database 105 of known video image sequences may include one or more specialized databases such as, but not limited to, a database of image indices of significant frames of initial sequences 151, a database of initial sequences 152, a database of image indices of significant frames of complete sequences 153, and a database of complete sequences 154.

The database of initial sequences 152 may, for instance, have only the first part of the complete know sequence that may be stored in the database of complete sequences 154. The database of complete sequences 154 may store images that have been compressed to save storage space, or may be stored uncompressed to reduce the time taken to do any computation on it such as, but not limited to, image indexing frames of it. The initial sequences may be as little as half a second of the completed sequence, or it may be longer and may, for instance range from 1 to 15 seconds, via 2, 5 and 10 second possibilities, or it may be some combination thereof. The length of the initial sequences may, for instance, be dependent on factors such as, but not limited to, a length of the complete sequence, a colorfulness of the sequences, a blurriness of the sequences, or some combination thereof.

The database of image indices of significant frames of initial sequences 151 may, for instance, be of sets of array image indices that match those used in the comparisons, and thereby reduce the amount of real time computation that may need to be performed in attempting to find matches.

Similarly, the database of image indices of significant frames of complete sequences 153 may, for instance, be of sets of array image indices that match those used in the comparisons, and thereby reduce the amount of real time computation that may need to be performed in attempting to find matches.

In one exemplary embodiment of the systems described above, the array of image indices may consist of an average image index and a perceptual image index, and if both the colorfulness of the images and the blurriness of the images exceed a predetermined quality threshold, a first set of image index thresholds may be selected from the array of predetermined image index thresholds, else a second set of the image index thresholds may be selected.

In a more specific exemplary embodiment, the colorfulness threshold may, for instance, be set to 20, the blurriness threshold may, for instance, be set to 4.9, and the first set of image index thresholds may, for instance, be the image distance vector (15, 15), while the second set of image index thresholds may, for instance, be the image distance vector (20, 21).

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method of identifying a cognate image sequence, comprising:
   providing a database of known video image sequences;
   comparing a first significant frame of an incoming stream of video images to one or more first significant frames of known image sequences in said database of known video image sequences, said comparing comprising:
      obtaining an array of 64 bit image indexes of said significant frames;
      determining an image quality indicator of one or more of said significant frames, said image quality indicator comprising both a colorfulness and a blurriness of said significant frame, and, wherein, said colorfulness is a value equal to the standard deviation of the red minus the green values of the image pixels of said frame added to 30 percent of the mean deviation of the average of the sum of the red and green values minus the blue value of the image pixels of said frame;

selecting, when both said colorfulness and said blurriness each exceed a predetermined quality threshold, a first set of image index thresholds from said array of predetermined image index thresholds, and when not, a second set of said image index thresholds, and, wherein each of said image index thresholds of said first set of image index thresholds is more stringent than the corresponding image index thresholds of said second set of image index thresholds;

determining a first significant frame match to have occurred if a difference in the image indices of all the image indices is less than or equal to said selected, predetermined image index threshold corresponding to said image indexing method; and, then, for a known video image sequences in which a match has occurred, repeating the preceding steps of comparing using a next significant frame; and, when said matching occurs sequentially for a predetermined number of significant frames in a particular known video image sequence, identifying said incoming stream of video images as being cognate with said particular known video image sequence.

2. The method of claim 1, wherein, said database of known video image sequences is compiled from image sequences obtained downstream from their point of origin.

3. The method of claim 2, wherein said downstream images have undergone at least one cycle of image compression and reconstruction before being used in said database.

4. The method of claim 1, wherein, said array of image indexes, comprises two or more different image indices obtained using an image index method that is one of an average image index, a perceptual image index, a difference image index, a block mean image index and a median image index.

5. The method of claim 4, wherein, said significant frames are one of a first frame after a scene cut; a first frame after a significant change in audio level, a first frame after a black frame, a first frame after a significant change in colorfulness, a first frame after a significant change in blurriness, and a frame that occurs 5 milliseconds after a previous significant frame.

6. The method of claim 1, wherein, the blurriness is a value equal to the variance of the Laplacian of the image pixels.

7. The method of claim 6 wherein, said array of predetermined image index thresholds are obtained by using machine learning on a training set of at least 1000 images.

8. The method of claim 7, wherein, said image indices comprise an average image index and a perceptual image index, said colorfulness threshold is 20, said blurriness threshold is 4.9, and said first set of image index thresholds comprise an image distance vector (15, 15) and the second set of image index thresholds comprise an image distance vector (20, 21).

* * * * *